United States Patent
Lin et al.

(10) Patent No.: US 10,962,830 B2
(45) Date of Patent: Mar. 30, 2021

(54) BACKLIGHT MODULE

(71) Applicant: QISDA CORPORATION, Taoyuan (TW)

(72) Inventors: Meng-Wei Lin, Taoyuan (TW); Yu-Chun Lo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/823,303

(22) Filed: Mar. 18, 2020

(65) Prior Publication Data

US 2020/0326592 A1   Oct. 15, 2020

(30) Foreign Application Priority Data

Apr. 9, 2019   (TW) .................................. 108112297

(51) Int. Cl.
*G02F 1/13357*     (2006.01)

(52) U.S. Cl.
CPC .. *G02F 1/133605* (2013.01); *G02F 1/133606* (2013.01); *G02F 1/133608* (2013.01)

(58) Field of Classification Search
None
See application file for complete search history.

(56) References Cited

FOREIGN PATENT DOCUMENTS

TW        201413349 A     4/2014
TW        201520658 A     6/2015

*Primary Examiner* — Vip Patel

(57) ABSTRACT

A backlight module includes a circuit board, a plurality of light emitting units, a support frame, a reflector, and a diffusion plate. The light emitting units are disposed on the circuit board. The support frame includes a plurality of first support members, wherein the first support members are disposed on the circuit board in parallel. The reflector is disposed on the support frame. The reflector includes a plurality of reflecting grids, wherein the reflecting grids are accommodated between the first support members and the light emitting units are located in the reflecting grids. The diffusion plate is disposed above the reflector.

5 Claims, 6 Drawing Sheets

BACKLIGHT MODULE

BACKGROUND OF THE INVENTION

1. Field of the Invention

The invention relates to a backlight module and, more particularly, to a backlight module using a support frame to fix a reflector on a circuit board.

2. Description of the Prior Art

Since a liquid crystal display (LCD) has advantages of thin thickness, light weight, low power consumption, no radiation pollution, and being compatible with semiconductor process, it has been applied in various electronic devices including notebook, mobile phone, digital still camera, personal digital assistant, and so on. The LCD utilizes a backlight module to provide light for a display panel, so as to display images. At present, the backlight module comprises a direct type backlight module and an edge type backlight module. Since a light source of the direct type backlight module is distributed uniformly behind a display panel, the direct type backlight module may obtain more uniform image. In general, the direct type backlight module has a reflector disposed on a circuit board, so as to enhance brightness of the light source. For local dimming design, a plurality of reflecting grids is formed on the reflector, so as to restrain light shape within the reflecting grids correspondingly. However, a contact area between the circuit board and the reflector with the reflecting grids is very small, such that the reflector cannot be attached on the circuit board well. Furthermore, if the reflecting grids are not aligned with the light source accurately, light shape may be changed and image uniformity may be affected.

SUMMARY OF THE INVENTION

An objective of the invention is to provide a backlight module using a support frame to fix a reflector on a circuit board, so as to solve the aforesaid problems.

According to an embodiment of the invention, a backlight module comprises a circuit board, a plurality of light emitting units, a support frame, a reflector and a diffusion plate. The light emitting units are disposed on the circuit board. The support frame comprises a plurality of first support members, wherein the first support members are disposed on the circuit board in parallel. The reflector is disposed on the support frame. The reflector comprises a plurality of reflecting grids, wherein the reflecting grids are accommodated between the first support members and the light emitting units are located in the reflecting grids. The diffusion plate is disposed above the reflector.

As mentioned in the above, the backlight module of the invention uses the support frame to fix the reflector on the circuit board. When the backlight module is assembled, the support frame may be adhered on the circuit board first and then the reflector may be adhered on the support frame, so as to fix the shape and the position of the reflector by the support frame. Accordingly, the invention can ensure image uniformity and local dimming performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
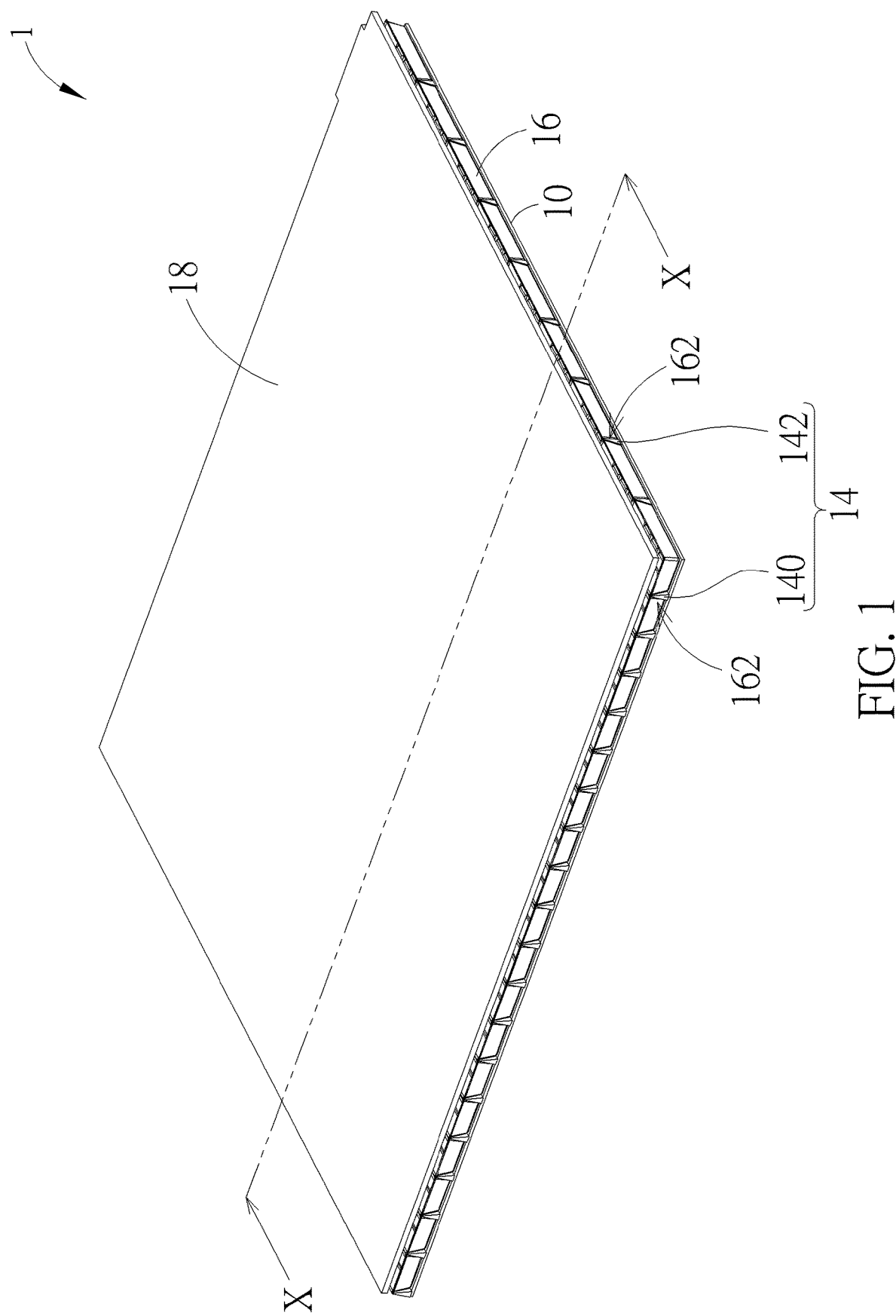
FIG. 1 is a perspective view illustrating a backlight module according to an embodiment of the invention.
Figure 2:
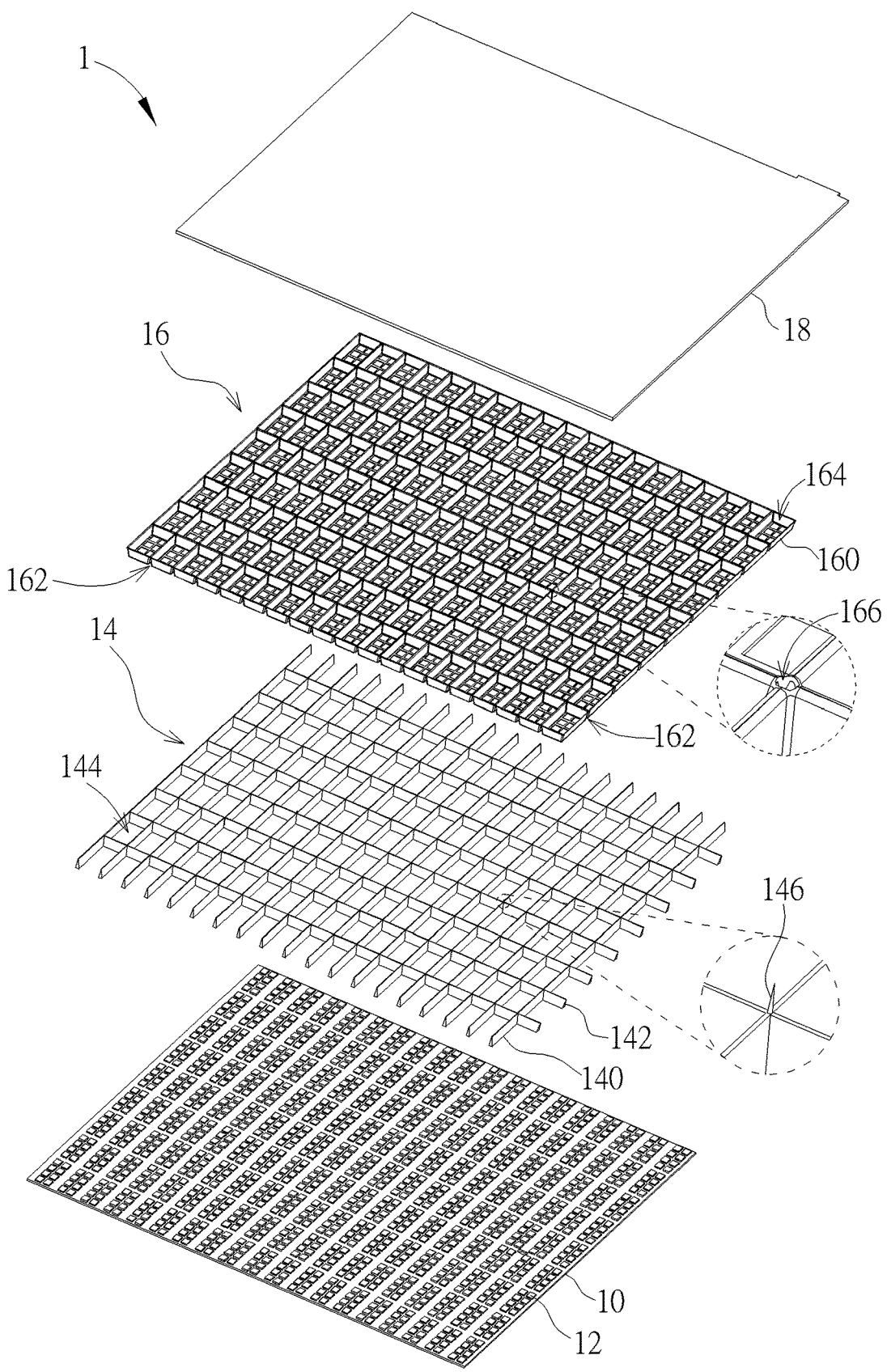
FIG. 2 is an exploded view illustrating the backlight module shown in FIG. 1.
Figure 3:
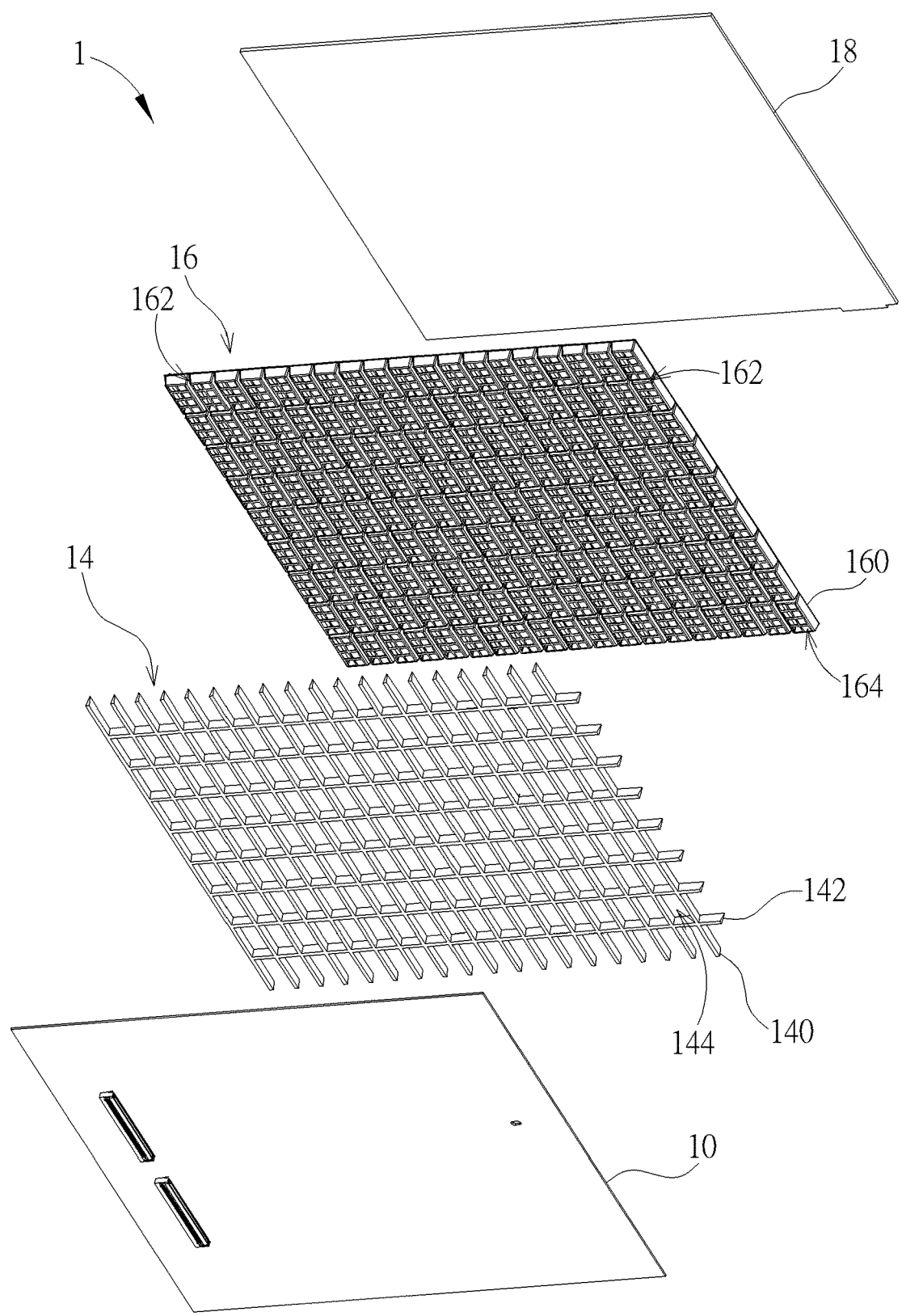
FIG. 3 is an exploded view illustrating the backlight module shown in FIG. 1 from another viewing angle.
Figure 4:
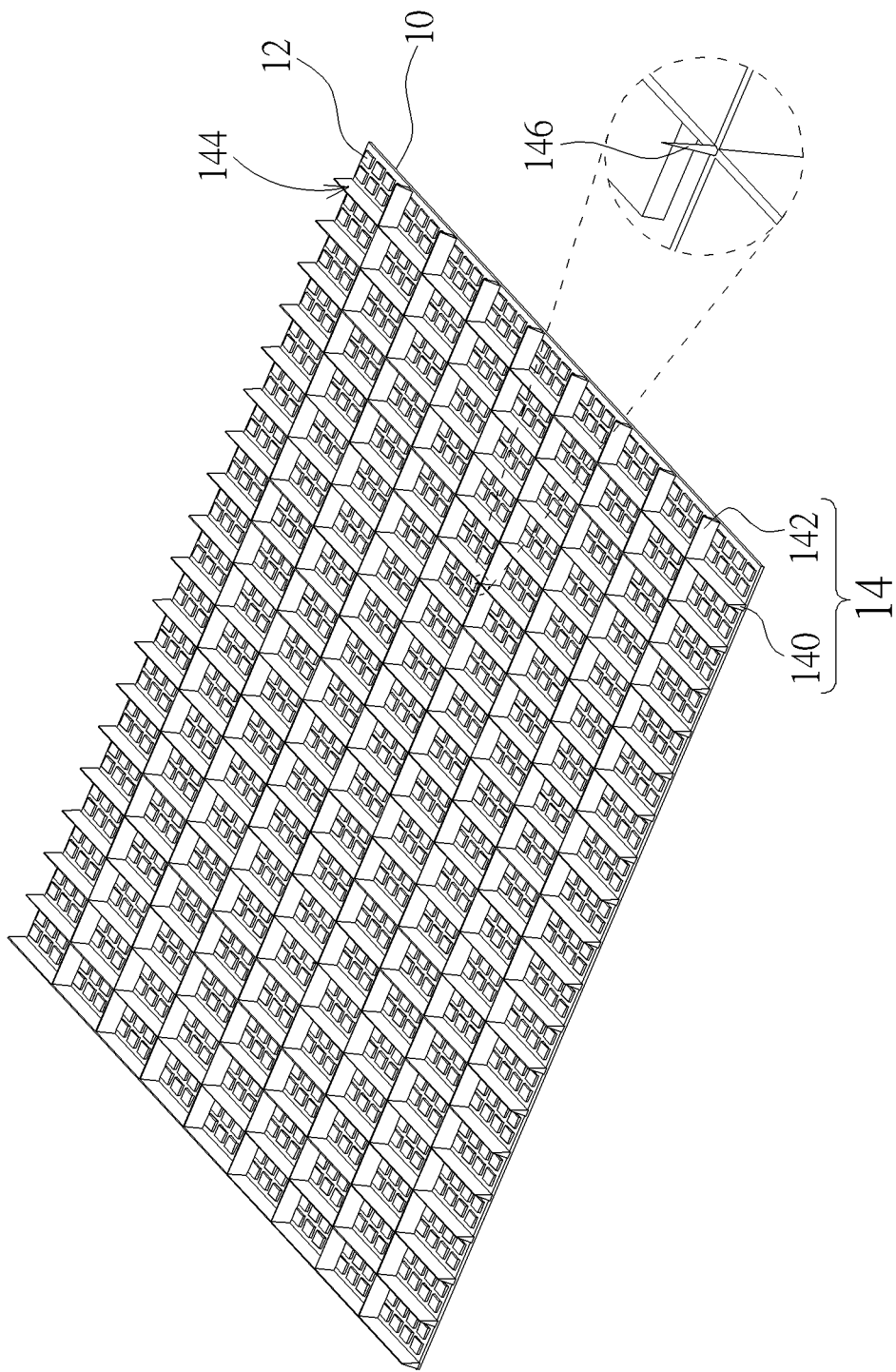
FIG. 4 is a perspective view illustrating the support frame disposed on the circuit board shown in FIG. 2.
Figure 5:
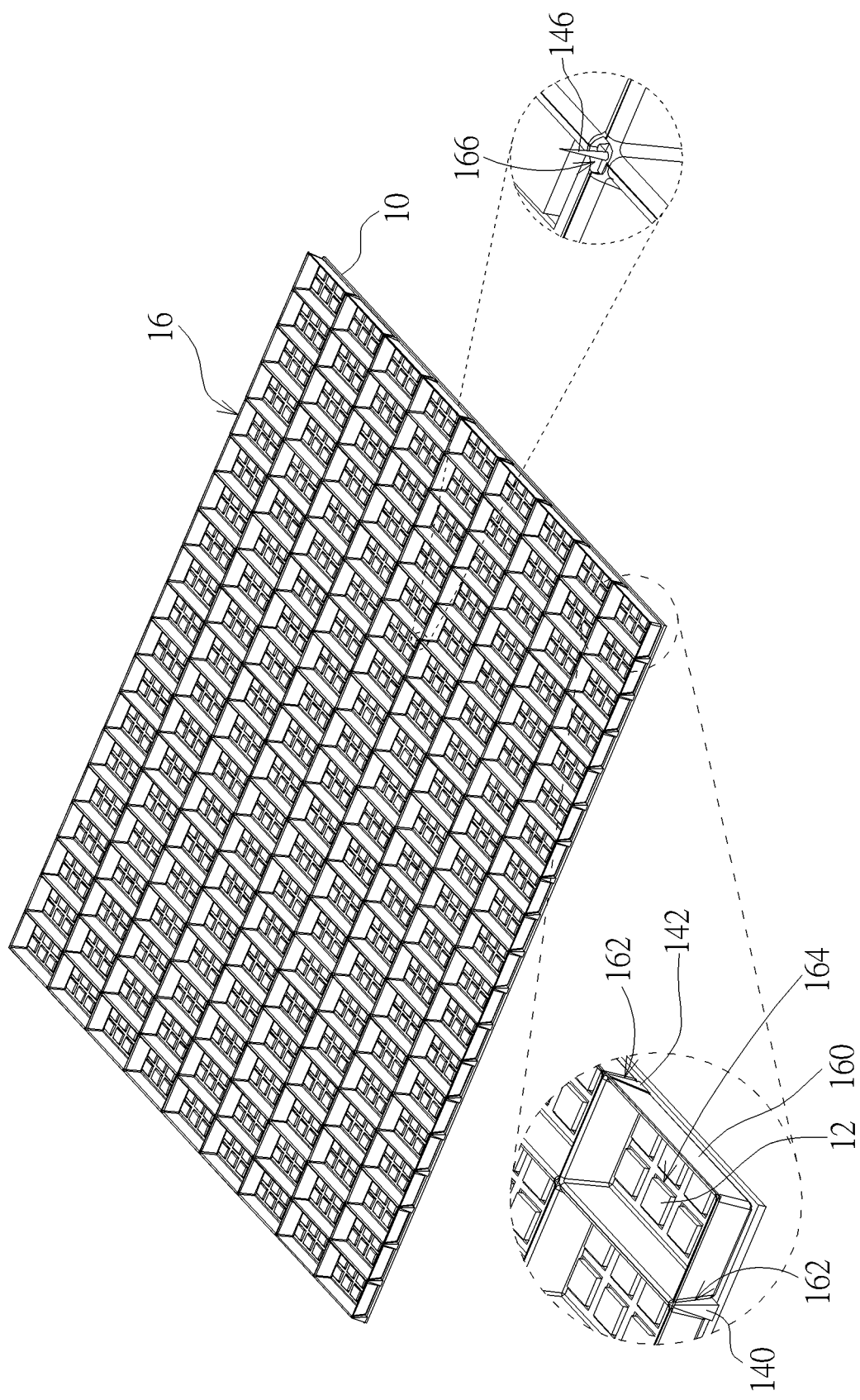
FIG. 5 is a perspective view illustrating the reflector disposed on the support frame shown in FIG. 2.
Figure 6:
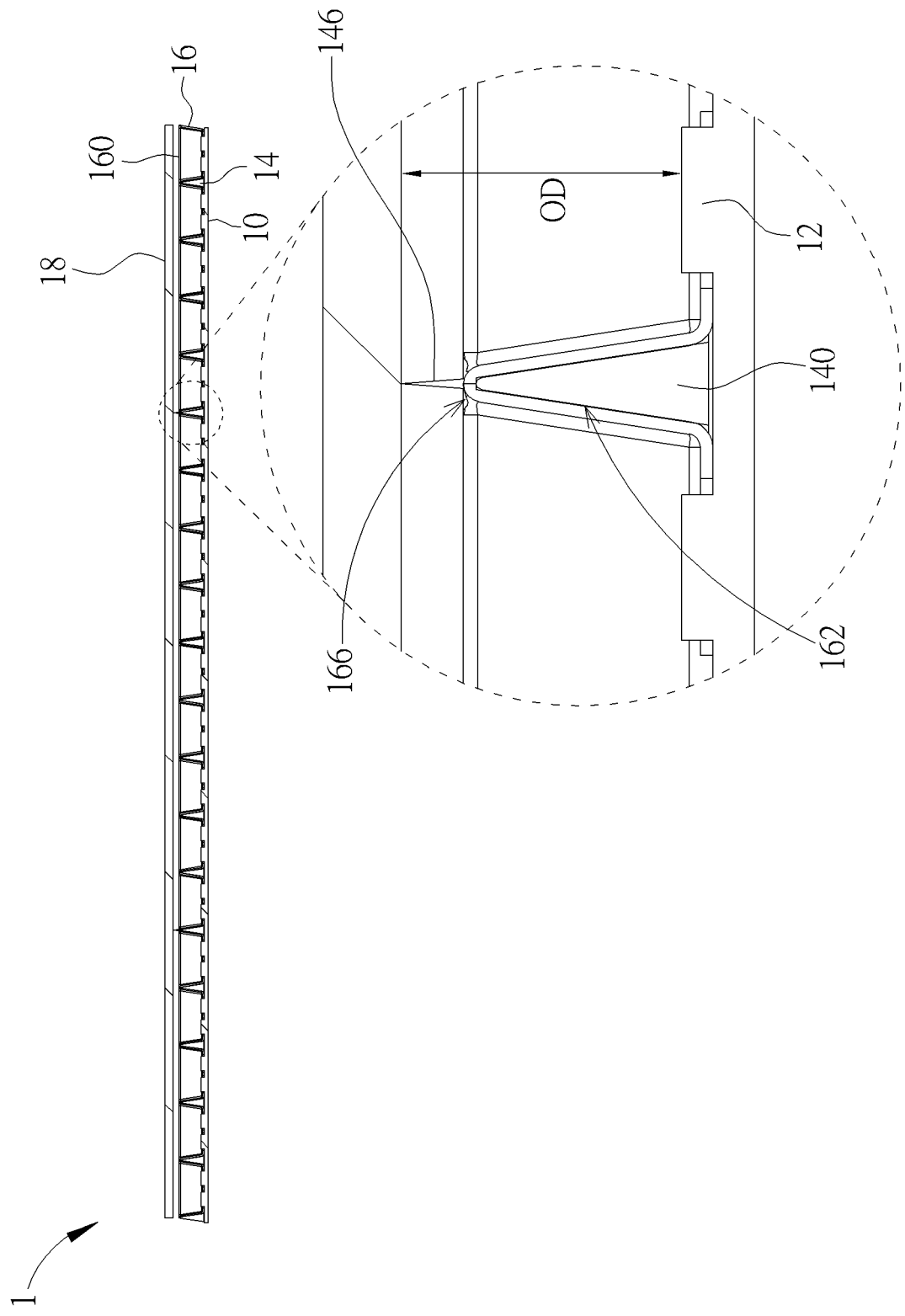
FIG. 6 is a sectional view illustrating the backlight module along line X-X shown in FIG. 1.

Referring to FIGS. 1 to 6, FIG. 1 is a perspective view illustrating a backlight module 1 according to an embodiment of the invention, FIG. 2 is an exploded view illustrating the backlight module 1 shown in FIG. 1, FIG. 3 is an exploded view illustrating the backlight module 1 shown in FIG. 1 from another viewing angle, FIG. 4 is a perspective view illustrating the support frame 14 disposed on the circuit board 10 shown in FIG. 2, FIG. 5 is a perspective view illustrating the reflector 16 disposed on the support frame 14 shown in FIG. 2, and FIG. 6 is a sectional view illustrating the backlight module 1 along line X-X shown in FIG. 1.

As shown in FIGS. 1 to 6, the backlight module 1 comprises a circuit board 10, a plurality of light emitting units 12, a support frame 14, a reflector 16 and a diffusion plate 18. In this embodiment, the backlight module 1 may be a direct type backlight module applied to a liquid crystal display device and configured to emit light to a display panel. The light emitting units 12 are disposed on the circuit board 10. In this embodiment, the light emitting units 12 may be, but not limited to, light emitting diodes. It should be noted that the number and the arrangement of the light emitting units 12 may be determined according to practical applications, so the invention is not limited to the embodiment shown in the figures.

In this embodiment, the support frame 14 may comprise a plurality of first support members 140 and a plurality of second support members 142. The first support members 140 may be disposed in parallel along a direction, the second support members 142 may be disposed in parallel along another direction, and the first support members 140 may intersect with the second support members 142, such that a plurality of accommodating spaces 144 are formed between the first support members 140 and the second support members 142. Furthermore, the support frame 14 may further comprise a plurality of support pillars 146, wherein the support pillars 146 may extend from intersections between the first support members 140 and the second support members 142. Needless to say, the support pillars 146 may also extend from any positions of the first support members 140 or the second support members 142. It should be noted that the number and the position of the support pillars 146 may be determined according to practical applications, so the invention is not limited to the embodiment shown in the figures.

In this embodiment, the reflector 16 comprises a plurality of reflecting grids 160 and a plurality of recesses 162, wherein each of the recesses 162 is located between two adjacent reflecting grids 160. The position and the shape of the recess 162 correspond to the position and the shape of the first support member 140 and the second support member 142. Furthermore, each of the reflecting grids 160 may comprise a plurality of through holes 164, wherein the position of the through holes 164 of each reflecting grid 160 corresponds to the position of the light emitting units 12 on the circuit board 10. It should be noted that each of the reflecting grids 160 may also comprise one single through hole only according to practical applications.

When the backlight module 1 is assembled, an adhesive may be coated on the bottom of the support frame 14 first, so as to adhere the support frame 14 on the circuit board 10, as shown in FIG. 4. At this time, the first support members 140 of the support frame 14 are disposed on the circuit board 10 in parallel and the second support members 142 of the support frame 14 are also disposed on the circuit board 10 in parallel, such that the light emitting units 12 are located in the accommodating spaces 144 correspondingly. In this embodiment, the shapes of the first support members 140 and the second support members 142 may be triangle to increase contact area between the support frame 14 and the circuit board 10, such that the support frame 14 may be adhered on the circuit board 10 more easily. Needless to say, the shapes of the first support members 140 and the second support members 142 are not limited to triangle and may be other shapes according to practical applications.

Then, an adhesive may be coated on the top of the support frame 14, so as to adhere the reflector 16 on the support frame 14, as shown in FIG. 5. At this time, the first support members 140 and the second support members 142 of the support frame 14 are embedded in the recesses 162 of the reflector 16, such that the reflector 16 is disposed on the support frame 14. Furthermore, the reflecting grids 160 of the reflector 16 are accommodated in the accommodating spaces 144 between the first support members 140 and the second support members 142 of the support frame 14, such that the light emitting units 12 are located in the through holes 164 of the reflecting grids 160 correspondingly.

Then, the diffusion plate 18 is disposed on the reflector 16. In this embodiment, the reflector 16 may have a plurality of through holes 166 formed thereon corresponding to the support pillars 146 of the support frame 14. Accordingly, after the reflector 16 is disposed on the support frame 14, the support pillars 146 of the support frame 14 pass through the through holes 166 of the reflector 16 and abut against the diffusion plate 18, as shown in FIG. 6. Since the support pillars 146 support the diffusion plate 18 at a specific height, an optical distance (OD) between the light emitting units 12 and the diffusion plate 18 can be ensured effectively, such that the light emitted by the light emitting units 12 can be mixed uniformly.

In practical applications, an optical film assembly (not shown) may be disposed on the diffusion plate 18 to improve optical characteristics of light, wherein the optical film assembly may comprise lots of optical films including a prism film, a diffusion film, and so on.

In another embodiment, the support frame 14 may comprise the first support members 140 only without the second support members 142. In other words, the invention may dispose the first support members 140 on the circuit board 10 in parallel, so as to fix the reflector 16 on the circuit board 10 by the first support members 140. However, if the support frame 14 comprises the first support members 140 and the second support members 142 simultaneously, the support frame 14 may be disposed on the circuit board 10 more easily, so as to improve the efficiency of assembling the support frame 14 and the circuit board 10.

As mentioned in the above, the backlight module of the invention uses the support frame to fix the reflector on the circuit board. When the backlight module is assembled, the support frame may be adhered on the circuit board first and then the reflector may be adhered on the support frame, so as to fix the shape and the position of the reflector by the support frame. Accordingly, the invention can ensure image uniformity and local dimming performance. Furthermore, the invention may use the support pillars of the support frame to support the diffusion plate at a specific height, so as to ensure the optical distance between the light emitting units and the diffusion plate, such that the light emitted by the light emitting units can be mixed uniformly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
   a circuit board;
   a plurality of light emitting units disposed on the circuit board;
   a support frame comprising a plurality of first support members, the first support members being disposed on the circuit board in parallel;
   a reflector disposed on the support frame, the reflector comprising a plurality of reflecting grids, the reflecting grids being accommodated between the first support members, the light emitting units being located in the reflecting grids; and
   a diffusion plate disposed above the reflector.

2. The backlight module of claim 1, wherein the reflector further comprises a plurality of recesses, the recesses are located between the reflecting grids, and the first support members are embedded in the recesses, such that the reflector is disposed on the support frame.

3. The backlight module of claim 1, wherein the support frame further comprises a plurality of second support members, the second support members are disposed on the circuit board in parallel, the first support members intersect with the second support members, and the reflecting grids are accommodated between the first support members and the second support members.

4. The backlight module of claim 3, wherein the reflector further comprises a plurality of recesses, the recesses are located between the reflecting grids, and the first support members and the second support members are embedded in the recesses, such that the reflector is disposed on the support frame.

5. The backlight module of claim 1, wherein the support frame further comprises a plurality of support pillars and the support pillars pass through the reflector and abut against the diffusion plate.

* * * * *